J. E. GILSON.
FRICTION CLUTCH.
APPLICATION FILED OCT. 1, 1909.
984,209.
Patented Feb. 14, 1911.
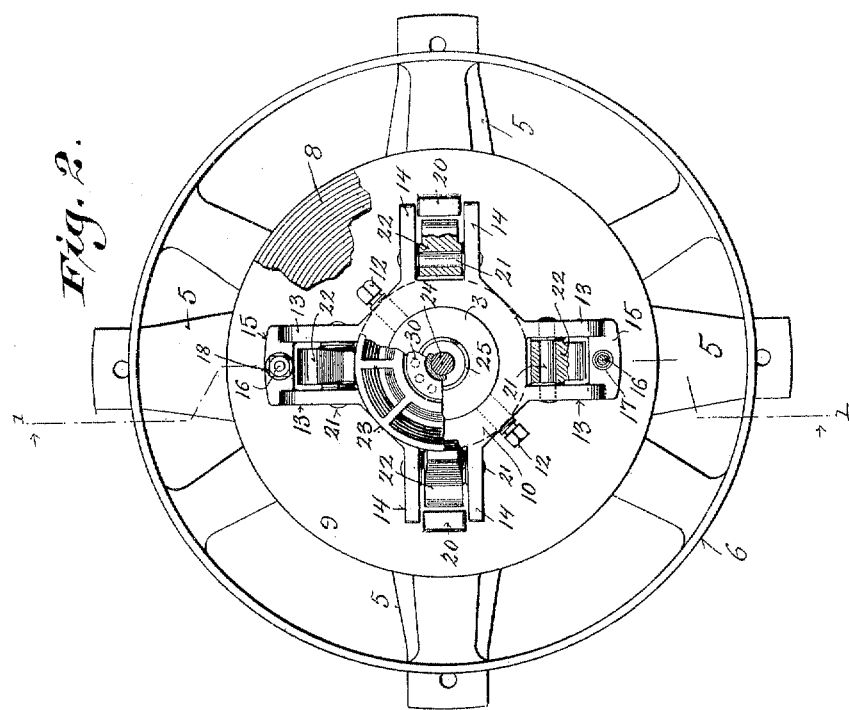
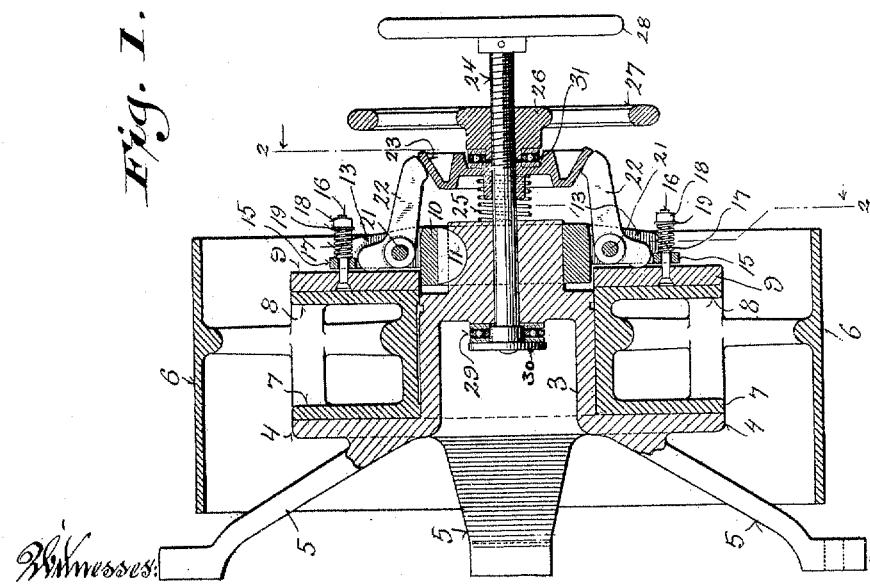
Witnesses:
Inventor:
John E. Gilson

UNITED STATES PATENT OFFICE.

JOHN E. GILSON, OF PORT WASHINGTON, WISCONSIN, ASSIGNOR TO GILSON MANUFACTURING COMPANY, OF PORT WASHINGTON, WISCONSIN.

FRICTION-CLUTCH.

984,209.  Specification of Letters Patent.  Patented Feb. 14, 1911.

Application filed October 1, 1909. Serial No. 520,584.

*To all whom it may concern:*

Be it known that I, JOHN E. GILSON, a citizen of the United States, and resident of Port Washington, in the county of Ozaukee and State of Wisconsin, have invented certain new and useful Improvements in Friction-Clutches; and I do hereby declare that the following is a full, clear, and exact description thereof.

My invention consists in what is herein particularly set forth with reference to the accompanying drawings and pointed out in claims, its object being to provide simple, economical and efficient quick-shift friction-clutches for various uses, as well as to equally distribute the strain in said clutches.

Figure 1 of the drawings represents a sectional view indicated by line 1—1 in Fig. 2, and illustrates a friction-clutch in accordance with my invention, and Fig. 2, a front elevation of said mechanism partly broken away and partly in section on the planes indicated by lines 2—2 in Fig. 1.

Referring by numerals to the drawings 3 indicates the rotary driver element of a friction-clutch in accordance with my invention, that form of said element herein shown being a partly tubular and shouldered cylindrical stud provided with a rear stop-flange 4 and arms 5. The flange is preferably wide enough to constitute a friction-disk, as herein shown, and the arms 5 are for attachment to a fly-wheel, pulley or other rotary part of a prime mover.

The driven element of the clutch is herein shown in the form of a pulley 6 normally loose on that portion of the stud 3 having the greatest diameter. The hub of the pulley is provided with flanges 7, 8, that oppose the stud-flange 4 and a friction disk 9 respectively, this disk 9 being loose on a ring 10 that is centered on the reduced portion of the stud 3, by means of a key 11, and clamped in place by set-screws 12, the diameter of the ring being the same as that of the major portion of said stud.

At quarter-circle intervals, the ring 10 is provided with arms 13 and 14 in pairs. The paired arms 13 are connected by bars 15, and extending through the friction-disk 9 and the bars are bolts 16 carrying spiral-springs 17 adjustable as to tension against said bars by means of nuts 18 run on the bolts, washers 19 being utilized between the springs and nuts. The arms 14 of the ring 10 straddle lugs 20 provided on the disk 9, and hung on pins 21 extending through the several paired arms are bell-crank levers 22 each having a short arm thereof in opposition to said disk. The other arm of each lever opposes a bevel-faced collar 23 loose on a partly screw-threaded stem 24 that extends through the reduced portion of the stud 3 central of the same, and a spiral-spring 25 is preferably arranged on the hub of the collar in opposition to the adjacent stud 3. The stem 24 and a nut 26 thereon are respectively provided with hand-wheels 27, 28 to facilitate their manipulation. The inner end of the stem 24 is headed, and a ball bearing 29 is preferably provided between the stem-head 30 and the stud 3, a similar bearing 31 being also preferably provided between the collar 23 and nut 26 aforesaid.

By holding the stem 24 and turning the nut 26 inward, the wedge-collar 23 is moved inward on said stem to actuate the levers 22, whereby the disk 9 is clamped against the flange 8 of the pulley-hub, the pulley being in turn clamped against the stop flange 4 of the stud 3, the result being a gripping together of the driving and driven members of the clutch.

To release the clutch, the stem 24 is held and the nut 26 run out, the collar 23, and friction disk 9 being then free to resume their normal positions, sticking being prevented as a result of expansion of the previously contracted springs 17 and 25.

In either setting or releasing of the clutch the stem 24 and nut 26 may be turned in opposite directions to quicken the operation, and the ball bearings on said clutch facilitate the turning of said stem and nut.

I claim:

1. In a friction-clutch, the combination of a rotary driving-member, a driven-member in normally loose sliding engagement with the one aforesaid opposite a stop with which the same is provided a ring rotative with the driving-member, a friction-disk in sliding engagement with the ring with which it is rotative in opposition to the driven-member, disk-controlling levers in fulcrum-connection with said ring, a screw-stem carried by said driving-member, a lever-actuating wedge-collar in sliding engagement with the stem, a spring interposed between the inner side of the collar and the aforesaid driving-member, and a nut on said stem opposing the outer side of said collar.

2. In a friction-clutch, the combination of a rotary driving-member, a driven-member in normally loose sliding engagement with the one aforesaid, opposite a stop with which the same is provided, a ring rotative with the driving-member, a friction-disk in sliding engagement with the ring, arms extended in pairs from said ring, bars connecting certain pairs of the arms, and lugs on said disk straddled by the remaining pairs of arms, bolts extending through the aforesaid disk and the bars, springs arranged on the bolts between said bars and nuts run on said bolts, levers in fulcrum-connection with the paired arms in opposition to the adjacent disk, a screw-stem carried by said driving-member, a lever-actuating wedge-collar in sliding engagement with the stem, and a nut run on said stem in opposition to the collar.

3. In a friction-clutch, the combination of a rotary driving-member, a driven-member in normally loose sliding engagement with the one aforesaid opposite a stop with which the same is provided, a ring rotative with the driving-member, a friction-disk in sliding engagement with the ring with which it is rotative in opposition to the driven-member, disk-controlling levers fulcrumed in connection with said ring, a screw-stem carried by said driving-member, a lever-actuating wedge-collar in sliding engagement with the stem, a nut on said stem in opposition to the collar, and ball bearings interposed between a head of the stem and the aforesaid driving-member and between said collar and nut.

4. In a friction-clutch, the combination of a rotary driving-member, a driven-member in normally loose sliding engagement with the one aforesaid, opposite a stop with which the same is provided, a ring rotative with the driving-member, a friction-disk in sliding engagement with the ring, arms extended in pairs from said ring, bars connecting certain pairs of the arms, and lugs on said disk straddled by the remaining pairs of arms, bolts extending through the aforesaid disk and bars, springs arranged on the bolts between said bars and nuts run on said bolts, levers in fulcrum connection with the paired arms in opposition to the adjacent disk, a lever-actuating wedge-collar having sliding support in connection with the driving-member, and means for actuating the collar.

In testimony that I claim the foregoing I have hereunto set my hand at Port Washington in the county of Ozaukee and State of Wisconsin in the presence of two witnesses.

JOHN E. GILSON.

Witnesses:
T. A. BOERNER,
H. W. BOLENS.